United States Patent
Oh et al.

(10) Patent No.: US 7,500,114 B2
(45) Date of Patent: Mar. 3, 2009

(54) APPARATUS AND METHOD FOR CONTROLLING POWER MANAGEMENT

(75) Inventors: Jang Geun Oh, Suwon-si (KR); Seo Kwang Kim, Incheon-si (KR)

(73) Assignee: LG Electronics Inc., Seoul (KR)

( * ) Notice: Subject to any disclaimer, the term of this patent is extended or adjusted under 35 U.S.C. 154(b) by 373 days.

(21) Appl. No.: 11/088,876

(22) Filed: Mar. 25, 2005

(65) Prior Publication Data

US 2006/0090087 A1   Apr. 27, 2006

(30) Foreign Application Priority Data

Oct. 27, 2004   (KR) ............... 10-2004-0086065

(51) Int. Cl.
*G06F 1/00* (2006.01)
(52) U.S. Cl. .......... 713/300; 713/320; 713/324
(58) Field of Classification Search .......... 713/300, 713/320, 324
See application file for complete search history.

(56) References Cited

U.S. PATENT DOCUMENTS

| | | | | |
|---|---|---|---|---|
| 5,832,285 A * | 11/1998 | Shimada | | 713/323 |
| 5,845,137 A * | 12/1998 | Tanaka | | 713/323 |
| 6,412,075 B1 * | 6/2002 | Klein | | 713/322 |
| 7,055,049 B2 * | 5/2006 | Atkinson | | 713/324 |
| 7,065,663 B2 * | 6/2006 | Sheller | | 713/320 |
| 7,178,042 B2 * | 2/2007 | Sakagami | | 713/300 |
| 7,203,847 B2 * | 4/2007 | Park | | 713/300 |
| 7,243,247 B2 * | 7/2007 | Oh | | 713/300 |
| 7,321,787 B2 * | 1/2008 | Kim | | 455/574 |
| 2002/0152408 A1 * | 10/2002 | Inui et al. | | 713/300 |
| 2003/0009702 A1 * | 1/2003 | Park | | 713/300 |
| 2003/0079152 A1 * | 4/2003 | Triece | | 713/322 |
| 2003/0172310 A1 * | 9/2003 | Moyer et al. | | 713/300 |
| 2004/0019815 A1 * | 1/2004 | Vyssotski et al. | | 713/322 |
| 2004/0038707 A1 * | 2/2004 | Kim | | 455/554.1 |
| 2004/0117679 A1 * | 6/2004 | Kim | | 713/320 |
| 2004/0243858 A1 * | 12/2004 | Dennis et al. | | 713/300 |
| 2006/0132109 A1 * | 6/2006 | Rodriguez et al. | | 323/282 |

FOREIGN PATENT DOCUMENTS

| | | |
|---|---|---|
| JP | 11-194846 | 7/1999 |
| JP | 2000-039937 | 2/2000 |
| JP | 2004-139547 | 5/2004 |
| JP | 2004-521419 A | 7/2004 |
| JP | 2004-246400 | 9/2004 |
| JP | 2004-259368 | 9/2004 |

OTHER PUBLICATIONS

Chinese Office dated Jun. 15, 2007.
Japanese Office Action dated Feb. 27, 2008.

* cited by examiner

*Primary Examiner*—Thomas Lee
*Assistant Examiner*—Vincent T Tran
(74) *Attorney, Agent, or Firm*—Ked & Associates LLP

(57) ABSTRACT

Embodiments of an apparatus and method for controlling a power management can reduce power consumption, generate less heat or increase the lifetime of the battery. When the operation mode of the CPU is changed into the deeper sleep mode (C4), an audible noise can be generated by the capacitors of the DC/DC converter, such that the C4 mode has not been used. However, according to embodiments of the invention the C4 mode can be enabled when a prescribed device or prescribed program is detected or when the preset conditions are satisfied.

18 Claims, 12 Drawing Sheets

Fig.5

| Execution | | Monitoring or setup means | | | Register value of chipset for C4 |
|---|---|---|---|---|---|
| | | filter Driver | Hook Routine | User setup | |
| Specific device | - Optical device (CD-ROM) | o | | | 0100 |
| | - Speaker use | o | | | |
| | - Sound, Video | o | | | |
| Specific program | - DVD Program | | o | | |
| | - WinAmp program | | o | | |
| Etc. | - Battery mode | | | o | |
| | - Surrounding noise whose level is higher than the preset level when built-in microphone is used in battery mode | | | o | |
| | - Rotation speed of CPU cooling fan is higher than the preset level | | | o | |

Fig.9A

```
// Routine for registering execute hook
STDAPI DllRegisterServer(void)
{
The following program shows an open of registry in order to register hook routine on the
registry.
    // Register under the shell execute hooks key.
CRegKey reg;
LONG    lRet;
    lRet = reg.Create ( HKEY_LOCAL_MACHINE, _T("SOFTWARE\\Microsoft\\Windows\\CurrentVersion
                        \\Explorer\\ShellExecuteHooks"),REG_NONE, REG_OPTION_NON_VOLATILE,
                        KEY_WRITE );
    if ( ERROR_SUCCESS != lRet )
        return HRESULT_FROM_WIN32(lRet);
    lRet = reg.SetValue ( _T("BatteryMiser Psap Shl Ext"),
                        _T("{26F5978F-6493-4ee3-B114-C0C3ACCF9D4D}") );
    if ( ERROR_SUCCESS != lRet )
        return HRESULT_FROM_WIN32(lRet);
The following program shows a registration in case OS is windows NT
    // On NT, register our extension as approved.
    if ( 0 == (GetVersion() & 0x80000000) )
        {
        CRegKey reg2;
        lRet = reg2.Open ( HKEY_LOCAL_MACHINE, _T("SOFTWARE\\Microsoft\\Windows
                        \\CurrentVersion\\Shell Extensions\\Approved"), KEY_WRITE );
        if ( ERROR_SUCCESS != lRet )
            {
            reg.DeleteValue ( _T("{26F5978F-6493-4ee3-B114-C0C3ACCF9D4D}") );
            return HRESULT_FROM_WIN32(lRet);
            }
        lRet = reg2.SetValue ( _T("BatteryMiser Psap"),
                        _T("{26F5978F-6493-4ee3-B114-C0C3ACCF9D4D}") );
        if ( ERROR_SUCCESS != lRet )
            {
            reg.DeleteValue ( _T("{26F5978F-6493-4ee3-B114-C0C3ACCF9D4D}") );
            return HRESULT_FROM_WIN32(lRet);
            }
        }
    reg.Close();
    // registers object, typelib and all interfaces in typelib
    return _Module.RegisterServer(TRUE);
}
```

Fig.9B

```
// Routine for canceling execute hook
STDAPI DllUnregisterServer(void)
{
CRegKey reg;
LONG    lRet;
The following program shows an open of registry in order to cancel the registerred routine
    lRet = reg.Open ( HKEY_LOCAL_MACHINE, _T("SOFTWARE\\Microsoft\\Windows\CurrentVersion
                     \\Explorer\\ShellExecuteHooks"), KEY_WRITE );
    if ( ERROR_SUCCESS == lRet )
        {
        reg.DeleteValue ( _T("{26F5978F-6493-4ee3-B114-C0C3ACCF9D4D}") );
        reg.Close();
        }
The following program shows a cancellation in case OS is windows NT
    if ( 0 == (GetVersion() & 0x80000000) )
        {
        lRet = reg.Open ( HKEY_LOCAL_MACHINE, _T("SOFTWARE\\Microsoft\\Windows
                         \\CurrentVersion\\Shell Extensions\\Approved"), KEY_WRITE );
        if ( ERROR_SUCCESS == lRet )
            {
            reg.DeleteValue ( _T("{26F5978F-6493-4ee3-B114-C0C3ACCF9D4D}") );
            }
        reg.Close();
        }
    return _Module.UnregisterServer(TRUE);
}
```

Fig.9C

```
//Fetch program list in the registry which will be examined when hooking
//Structure
//
//    xxxxxxC:\program files\powerdvd\powerdvd.exe
//    1  5 7                                              .... 255(max)
//
//    the first 6 byte is index number of power scheme which will be applied when program excutes,
//    the seventh byte and thereafrer are path regarding the program
//
// Put reading and then all data into an arrangement of linked list structure.
//
int ReadAllPsAp(void)
{
  int i=0;
  HKEY hPsApKey;
  DWORD retCode;
  TCHAR vName[MAX_PATH];
  ULONG lNameLength=MAX_PATH;
  TCHAR vData[MAX_PATH];
  ULONG lDataLength=MAX_PATH;
  DWORD type=REG_SZ;
  TCHAR tmp[MAX_PATH];
  PSApplication *pPsap_t=NULL;
  if (m_ppsap) DeleteAllData();//If data exists....
The following program shows an open of folder of registry which program lists exist
  if (ERROR_SUCCESS != RegOpenKeyEx(HKEY_CURRENT_USER,_T("Software\\BatteryMiser\\Battery
miser\\psap"), 0, KEY_READ | KEY_WRITE, &hPsApKey))
  {
    return 0;
  }
  m_ppsap=new PSApplication;//Beigning point
  pPsap_t=m_ppsap;
  m_ppsap->ps=-1;
  m_ppsap->path=NULL;
  m_ppsap->next=NULL;
  for (i = 0, retCode = ERROR_SUCCESS; retCode == ERROR_SUCCESS; i++)
  {
The following program shows that program lists registered on the folder are read
retCode=RegEnumValue(hPsApKey,i,(LPTSTR)vName,&lNameLength,NULL,&type,(LPBYTE)vData,&lDataLength);
    if (retCode == (DWORD)ERROR_SUCCESS)
    {
      _tcsncpy(tmp,vData,6);
      pPsap_t->ps=atoi(tmp);
      pPsap_t->path = new TCHAR [MAX_PATH];
          if(pPsap_t->path) _tcsncpy(pPsap_t->path,vData+6,MAX_PATH-6);
#ifdef DEBUG
      sprintf(tmp,"Loading... CBMPsapShlExt -> %d,%d:%s\n",i,pPsap_t->ps,pPsap_t->path);
      OutputDebugString(tmp);
#endif
The following program shows that a list which is read is registered on the memory
pPsap_t->next=new PSApplication;
      pPsap_t->next->ps=-1;
      pPsap_t->next->path=NULL;
      pPsap_t->next->next=NULL;
      pPsap_t=pPsap_t->next;
    }
    lNameLength=MAX_PATH;
    lDataLength=MAX_PATH;
  }
  RegCloseKey(hPsApKey);
  return i;
}
```

Fig.9D

```
// hooking routine..
// Call the following routine, if a program is executed on windows
STDMETHODIMP CBMPsapShlExt::Execute ( LPSHELLEXECUTEINFO pei )
{
  if ( NULL == pei->lpFile )
        return S_FALSE;
The following program shows that the present executing program is compared with the
registered program on the
  int i=0;
  while(pPsap_t)
  {
    if (pPsap_t->path && 0 == _tcsicmp ( pei->lpFile, pPsap_t->path)) //if the executed
program is registered,
    {
The following program shows that the registered program is informed to the battery miser
HWND hWnd= FindWindow(_T("BatteryMiser"),_T("Battery miser")) ; //searching for battery miser
      if (hWnd)
      {
        PostMessage(hWnd,UM_CH_PSAP,pPsap_t->ps,i);   //send a message changing power scheme
        break;
      }
    }
    pPsap_t=pPsap_t->next;
    if (i++>1000) break;
  }
      return S_FALSE;
}
```

APPARATUS AND METHOD FOR CONTROLLING POWER MANAGEMENT

BACKGROUND OF THE INVENTION

1. Field of the Invention

The present invention relates to an apparatus and method for controlling power management.

2. Background of the Related Art

A central processing unit (CPU) has a plurality of power states. In the specification of the Advanced Configuration and Power Interface (ACPI), the power states of the CPU are classified into C0 (working), C1 (auto halt), C2 (sleep), C3 (deep sleep) and C4 (deeper sleep).

The C0 state is defined as a system working state where instructions are executed. The C0 state does not provide a specific power saving.

For the efficient use of power, a CPU in a system generally operates as follows. The system can be changed into an auto halt mode (C1), a sleep mode (C2), a deep sleep mode (C3) and a deeper sleep mode (C4).

The auto halt mode (C1) is a lowest latency state, where software is not affected by a hardware latency state. The sleep mode (C2) and the deep sleep mode (C3) provide more power savings over the auto halt mode (C1) and are executed when no signal is inputted for a predetermined time.

The deeper sleep mode (C4) is a standby mode that is higher than the deep sleep mode (C3). The deeper sleep mode (C4) has a lower voltage than the deep sleep mode (C3) and has the longest latency when changing into the normal operation state. The deeper sleep mode (C4) provides more power savings than the C2 and C3.

FIG. 1 is a block diagram of an apparatus for controlling power management according to the related art. Referring to FIG. 1, a voltage of a CPU 10a must be changed when an operating frequency is changed. Therefore, a VID (voltage identifier) value is transferred to a CPU core DC/DC controller 10b to adjust a voltage applied to the CPU.

That is, the CPU core DC/DC controller 10b receives the VID value from the CPU 10a and outputs a corresponding voltage of a VID table to the CPU 150. The VID table is embedded in the CPU core DC/DC controller 10b of a DC/DC converter.

When the CPU enters the deeper sleep mode (C4), the VID value is not changed, but the voltage is changed. The CPU core DC/DC controller 10b receives the deeper sleep signal (a high active signal) from a South bridge 10c and applies the preset voltage to the CPU 150.

In this case, the deeper sleep mode (C4) is entered/exited at regular intervals. However, an audio noise occurs in capacitors of a power controller 140 included in the DC/DC converter.

The VID is a binary value that allows an output of a voltage corresponding to a frequency. When the CPU changes the frequency, the VID value is transferred to the CPU core DC/DC controller 10b and then the DC/DC converter changes the voltage applied to the CPU.

The related art power management will be described with reference to FIG. 1. A South bridge 10c is used to control a peripheral device and a power supply, and a North bridge (not shown) is used to detect an operating frequency of the CPU 10a.

The South bridge 10c is connected to the North bridge (not shown) and inputs an enable signal corresponding to the deeper sleep mode (C4) to the CPU core DC/DC controller 10b. At this point, the CPU core DC/DC controller 10b controls the power controller 140 to output a voltage corresponding to the frequency and the deeper sleep mode (C4).

In the deeper sleep mode (C4), the South bridge 10c outputs a high active signal to the CPU core DC/DC controller 10b. Meanwhile, the system is operated so that when the C4 enable signal is inputted, the preset voltage (e.g., 0.748 V) is outputted regardless of the VID value.

The CPU is operated in a plurality of power management modes. In the respective power management modes, the CPU can be separately operated in a high frequency mode (HFM) and a low frequency mode (LFM) depending on the operating frequencies. In the respective operating frequencies, the CPU can also be operated in the power management modes C0, C1, C2, C3 and C4.

In the HFM, an exemplary voltage at a normal mode (C0) equals 1.502 V (VID=1001). Further, in the HFM, an exemplary voltage at a deeper sleep mode (C4) equals 0.748 V (VID=1100)

In this case, for the C4 mode, the deeper sleep signal becomes high and thus the voltage greatly changes from 1.502 V to 0.748 V. Since the voltage changes greatly, a piezoelectric effect occurs in an input ceramic capacitor of the power terminal caused by ripples of the audio frequency band, and thus, a stack plate of the capacitor vibrates. The vibration can also make a printed circuit board (PCB) vibrate, resulting in noise. For these reasons, the C4 mode is inconvenient to users so that its function has been scarcely used.

As described above, related art apparatus and method for operating the C4 mode have various disadvantages. For example, a decoupling ceramic of an output terminal of a CPU recommended by CPU manufacturers (e.g., Intel) vibrates in the deep sleep mode (C3) or deeper sleep mode (C4), resulting in generating noise. However, the C3 mode generates less noise than the C4 mode, and accordingly, it is widely used.

In order to try and remove the noise, the input capacitor of the CPU core power terminal is replaced with a Poscap (one capacitor). However, if all capacitors of the power terminal and the output capacitors are not replaced, the noise cannot be completely removed. Although the complete noise reduction can be achieved by replacing all ceramic capacitors, this causes the increase in the PCB space and the manufacturing cost. For these reasons, most of notebook computers do not support the C4 mode, and thus the lifetime of the battery can be reduced. In addition, the use of the power supply, especially the battery, cannot be efficiently managed.

The above references are incorporated by reference herein where appropriate for appropriate teachings of additional or alternative details, features and/or technical background.

SUMMARY OF THE INVENTION

An object of the invention is to solve at least the above problems and/or disadvantages or to provide at least the advantages described hereinafter.

Another object of the present invention is to provide an apparatus and method for controlling a power management that substantially obviates one or more problems caused by limitations and disadvantages of the related art.

Another object of the present invention is to provide an apparatus and method for controlling a power management where the C4 mode can be used when a prescribed device or program is detected or when a preset condition is satisfied.

Another object of the present invention is to provide apparatus and method for controlling a power management where a C4 mode can be automatically enabled by employing a filter driver to monitor the use of a preset device or component.

Another object of the present invention is to provide an apparatus and method for controlling a power management where a C4 mode can be used depending on the execution or operation state of at least one specific application by the program such as a shell execute hook routine.

Another object of the present invention is to provide an apparatus and method for controlling a power management where a C4 mode can be used when a battery mode, a sound output or an earphone are detected or when a surrounding noise level is higher than a preset level.

Another object of the present invention is to provide an apparatus and method for controlling a power management when a specific device or program is detected or when the specific conditions are satisfied, a corresponding voltage can be outputted in response to a signal outputted from the register of the South bridge.

To achieve at least these objects and other advantages in a whole or in part and in accordance with one aspect of the invention, there is provided an apparatus for controlling a power management in a system that uses a power source, the apparatus includes a detection block configured to detect whether a prescribed condition is satisfied and a control device coupled to the detection block configured to output a signal corresponding to a C4 power management state based on information detected by the detection block.

To further achieve at least these objects and other advantages in a whole or in part and in accordance with one aspect of the invention, there is provided a method for controlling a power management that includes detecting whether a preset device or a preset application is used in a system, controlling a C4 power management mode of a power device based on the detected result and performing a power management based on the controlling operation.

To further achieve at least these objects and other advantages in a whole or in part and in accordance with one aspect of the invention, there is provided a method for controlling a power management that includes registering information to operate a C4 power management mode, detecting a current system operation information based on the registered information, outputting a C4 power management control signal to a power device when the detection detects the registered information is satisfied and controlling a control device based on the C4 power management control output signal.

To further achieve at least these objects and other advantages in a whole or in part and in accordance with one aspect of the invention, there is provided a method for controlling a power management that includes searching whether a C4 mode of power management modes is supported according to types of a control device, operating a C4 monitoring device, outputting a signal for controlling an enable/disable of the C4 mode, based on the operation of the C4 monitoring device and performing a power management based on the output signal.

To further achieve at least these objects and other advantages in a whole or in part and in accordance with one aspect of the invention, there is provided a method for controlling a power management that includes selecting C4 power mode enable/disable, monitoring for specific conditions and enabling performing C4 power mode based result of the monitoring.

Additional advantages, objects, and features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

BRIEF DESCRIPTION OF THE DRAWINGS

The invention will be described in detail with reference to the following drawings in which like reference numerals refer to like elements wherein:

FIG. 5 is a table showing exemplary register value for a C4 mode of PM modes;

FIG. 9A is a diagram showing an exemplary routine for registering a shell execute hook used to hook the running program;

FIG. 9B is a diagram showing an exemplary routine for unregistering a shell execute hook;

FIG. 9C is a diagram showing an exemplary routine for reading a program to be tested from a registry during a hooking; and FIG. 9D is a diagram showing an exemplary hooking routine that is called when a program is executed.

DETAILED DESCRIPTION OF PREFERRED EMBODIMENTS

Figure 1:
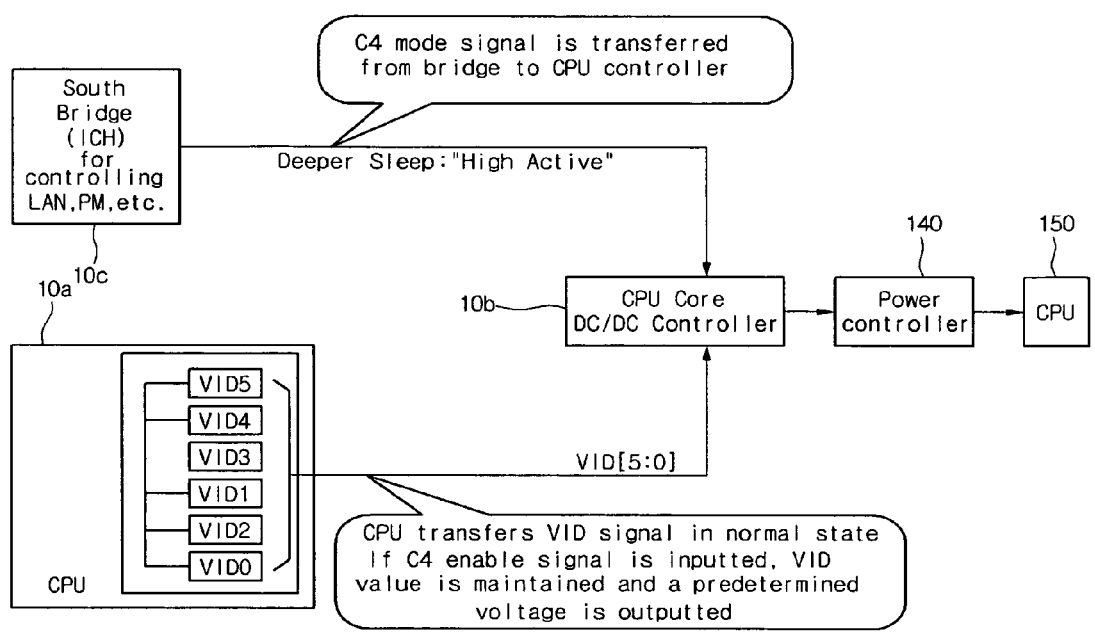
FIG. 1 is a block diagram of an apparatus for controlling a power management according to the related art.
Figure 2:
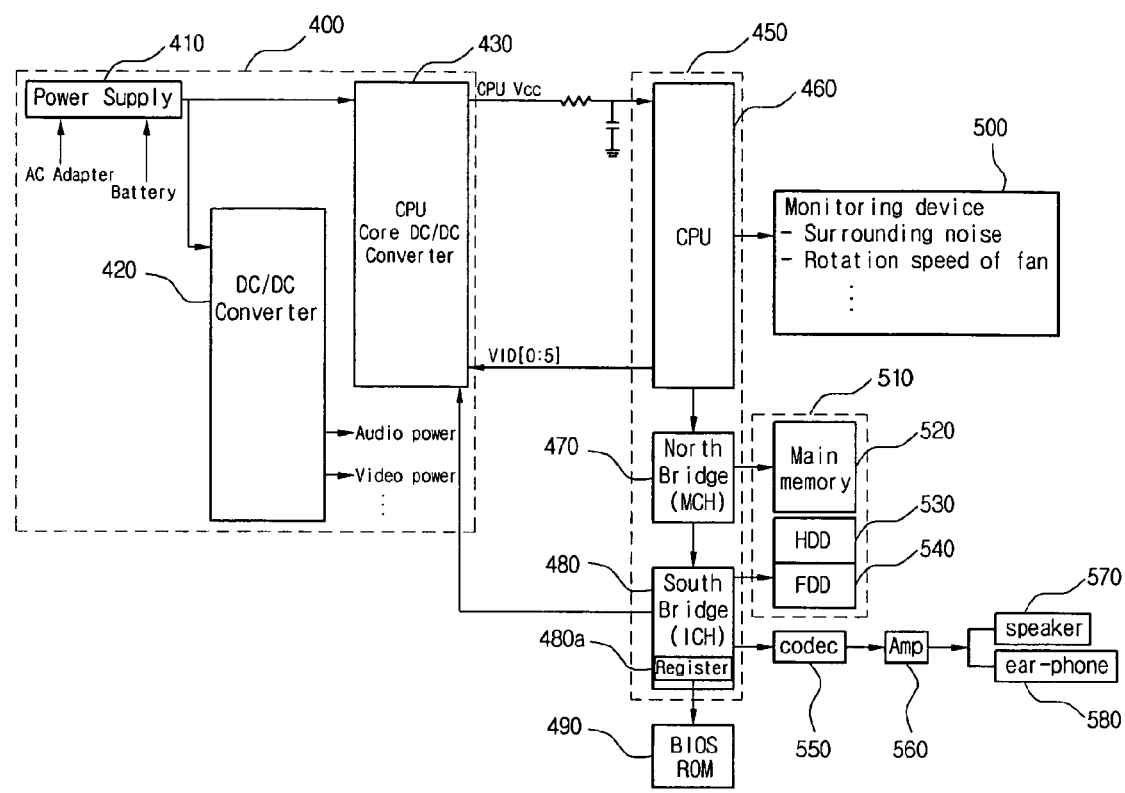
FIG. 2 is a block diagram of an apparatus for controlling a power management (PM) according to a preferred embodiment of the present invention.

FIG. 2 is a block diagram showing an embodiment of an apparatus for controlling a power management according to the present invention. As shown in FIG. 2, the apparatus for controlling power management can include a power device 400, a memory device 510, and a control device 450. Also, the power device 400 can include a power supply 410, a DC/DC converter 420, and a CPU core DC/DC converter 430.

The power supply 410 can supply a DC voltage generated from a battery or an AC adapter as an input power source. The DC/DC converter 420 can convert the DC voltage into a voltage required for the devices and configurations. The CPU core DC/DC converter 430 can convert the DC voltage into a voltage that can allow the CPU to operate in two or more frequencies (e.g., HFM, LFM) and power management modes. However, the present invention is not intended to be so limited.

The memory device 510 can include a detection block that detects a device and/or a program used in the system. Based on the information provided from the detection block, the control device 450 can output a specific value to the power device so as to generate a voltage corresponding to a preset power state.

For example, the output voltage of the CPU core DC/DC converter 430 can vary with the frequency and the C4 mode.

The control device 450 can include a CPU 460, a North bridge (e.g., MCH) 470 as a first chipset, and a South bridge (e.g., ICH) 480 as a second chipset. The North Bridge 470 can be coupled to the CPU 460 to control input/output of a system bus.

The South Bridge 480 can include a register 480*a* and manage input/output of peripheral devices and/or power. When a specific device or program is detected or when a specific condition is satisfied, a corresponding voltage can be outputted to the power device. For example, the corresponding voltage can be output in response to a signal outputted by setting a specific bit of a register contained in a South bridge for managing a peripheral device and a power source.

The memory device 510 can include a main memory 520, an HDD 530 and a FDD 540. The HDD 530 can store a power or battery management routine such as a "battery miser" program that can contain a filter driver and/or a shell execute hook routine, which can detect a device and/or a program used in the system. The FDD 540 can serve as an auxiliary memory.

Also, the apparatus for controlling power management (PM) can further include a BIOS read only memory (ROM) 490, a monitoring device 500, a codec 550, an amp 560, a speaker 570, or an earphone 580. The BIOS ROM 490 preferably stores a basic input/output system (BIOS) that performs booting sequences by recognizing/setting peripheral devices and finds an operating system of the apparatus or computer system.

The monitoring device 500 can monitor/detect a current surrounding noise and/or a current fan speed, which can be compared with a preset value stored in the memory. The codec 550, the amp 560, the speaker 570 and the earphone 580 can be coupled to the South bridge 480 to output sounds.

The speaker 570 or the earphone 580 can be used with minimal or without any influence from noise occurring in entering the C4 mode. Accordingly, in one embodiment, the C4 mode can be enabled corresponding to use of such devices.

Upon the system operation, the battery miser stored in the HDD 530 can be loaded onto another memory (for example, the main memory 520). The loaded battery miser can be executed by the CPU 460 of the control device 450.

Then, if a preset register value is set that corresponds to the current operating device and/or program detected by the battery miser (e.g., a software (S/W) driver), the South bridge 480 can output a deeper sleep signal to the CPU core DC/DC converter 430. The CPU core DC/DC converter 430 can output a voltage for the C4 mode in response to the deeper sleep signal.

The S/W driver (e.g., filter driver/shell execute hook routine) contained in the battery miser can set a register value of the South bridge used for monitoring a device/application used (e.g., enabled/disabled) in a current system and operate the CPU 460 in the C4 mode. The S/W driver can correspondingly return the CPU 460 from the C4 mode when the running program is terminated.

Figure 3:
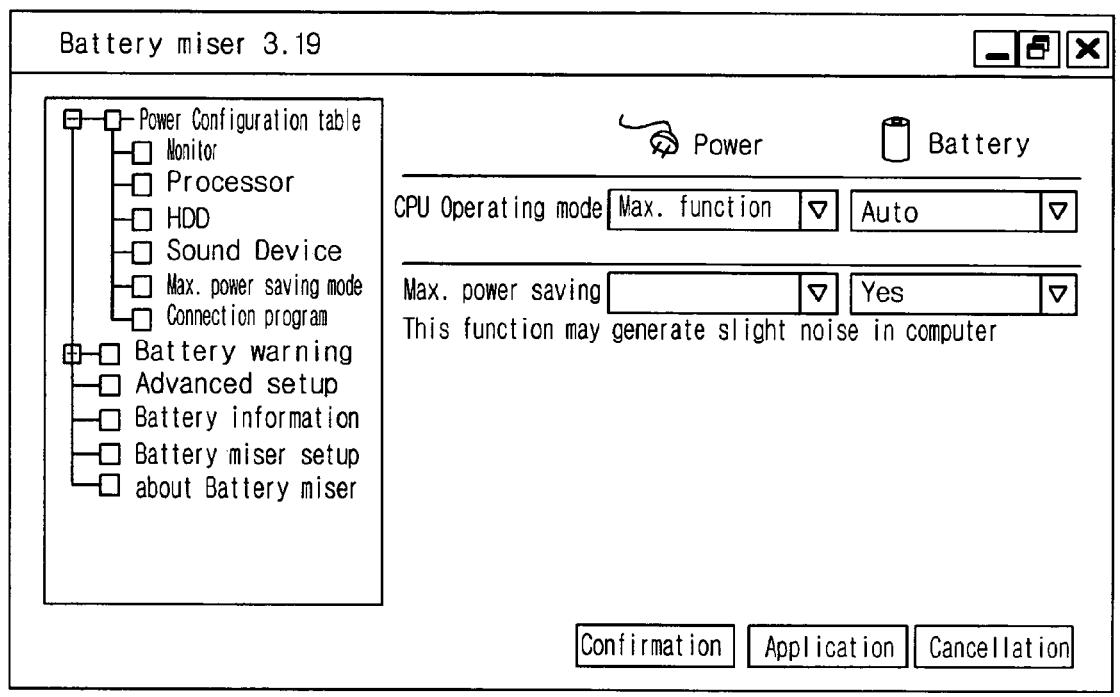
FIG. 3 is a diagram showing a setup and management of the PM by an exemplary battery management routine.

FIG. 3 is a diagram showing the setup and management of the PM (system power management) by an exemplary management controller (e.g., the battery miser application). However, the present invention is not intended to be so limited.

As shown in FIG. 3, the PM can be set to operate the C4 mode with respect to a specific device and/or program and/or a condition by inserting a selectable menu item that can enable the C4 mode within CPU items. As shown in FIG. 3, a tab allows setup/control/enabling of a maximum power saving mode (e.g., the C4 mode). A noise warning can be included.

A procedure of performing the PM by using the battery miser can be as follows.

1. Search/monitor a register associated with the use of the C4 mode, depending on the kinds of the South bridge chipset. For example, it can be checked whether a corresponding register is a register that can set a specific bit that enables the C4 mode in a general PM configuration 1 register or the like.

2. Register a hook routine that can monitor a running program (e.g., application).

3. Install a filter driver in a specific device (for example, a sound device).

4. Enable or disable the C4 mode of the CPU when a detection message is inputted from a filter driver or a hook routine.

Also, when executing the PM on a specific program (or an additional program/device), a connection program can be selected to set the corresponding program or register an additional target program.

Figure 4:
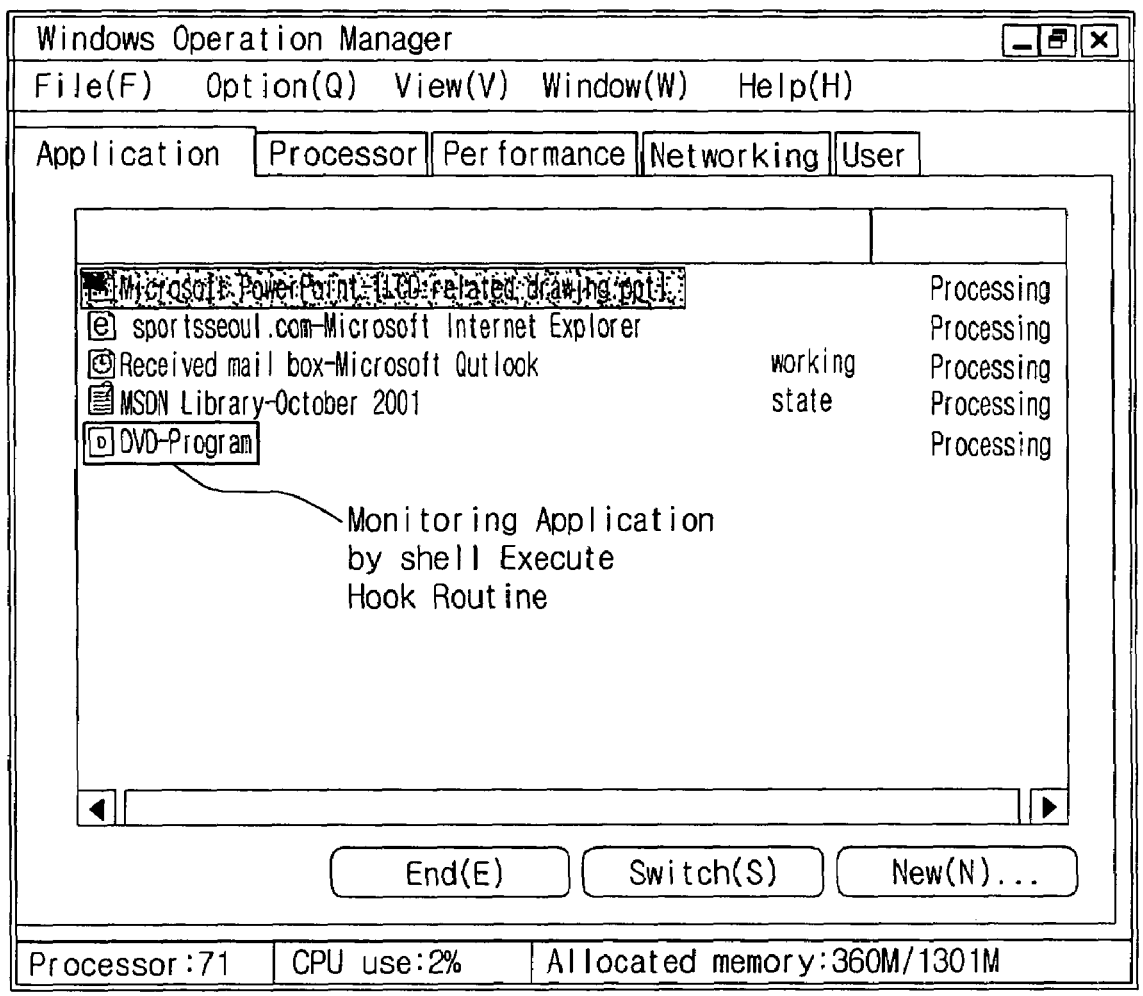
FIG. 4 is a diagram showing an detection of a current running application by an exemplary shell execute hook program stored in an HDD depicted in FIG. 2.

FIG. 4 is a diagram showing a detection of a current running application by an exemplary shell execute hook program stored in a memory such as the HDD depicted in FIG. 2. As shown in FIG. 4, a DVD program to which the PM will be executed is unregistered by the shell execute hook routine.

An examplary process of recognizing a current running device to which the PM will be executed and setting the PM by the filter driver will now be described.

A function of allowing the filter driver to recognize a device to which the PM will be executed can be as follows:

BOOL Set Device for PM( ):

Return Value

Nonzero if the device is successful; otherwise 0.

The function can be executed when the current running device performs the PM. Therefore, the filter driver can find the current running device by hooking the function.

In general, since a specific device is operated by a specific program, the PM can be performed by detecting either of the device and the program. However, the present invention is not intended to be so limited.

According to an embodiment of the present invention, a specific device can be recognized by the filter driver and a specific program can be hooked by the shell execute hook routine. Exemplary rationale for device monitoring operations can be as follows.

1. A certain device may be operated by a plurality of programs. In this case, the respective programs must be registered.

2. A new program using a specific device can be introduced. In this case, the new program must be additionally registered as a monitoring target.

Accordingly, if the device itself is monitored using the filter driver, the use of the device can be instantly recognized regardless of the program. However, the present invention is not intended to be so limited.

FIG. 5 is a diagram showing an exemplary table for the deeper sleep mode (C4) of the PM modes that can be operated in the system. As shown in FIG. 5, the C4 mode can be operated when the specific device is detected by the filter driver, or when the specific program is hooked by the shell execute routine, or when the condition set by the user is satisfied.

The use of an optical driver (e.g., CD-ROM), a speaker, an amp, a sound or video card can be detected by the filter driver. However, the present invention is not intended to be so limited.

The use of a DVD program or a Winamp program can be hooked by the shell execute hook program. However, the present invention is not intended to be so limited.

In addition, a battery mode, a level of the surrounding noise when using a built-in microphone, a sound output, a rotation speed of a cooling fan or the like can be detected by conditions set by the users. However, the present invention is not intended to be so limited.

Figure 6:
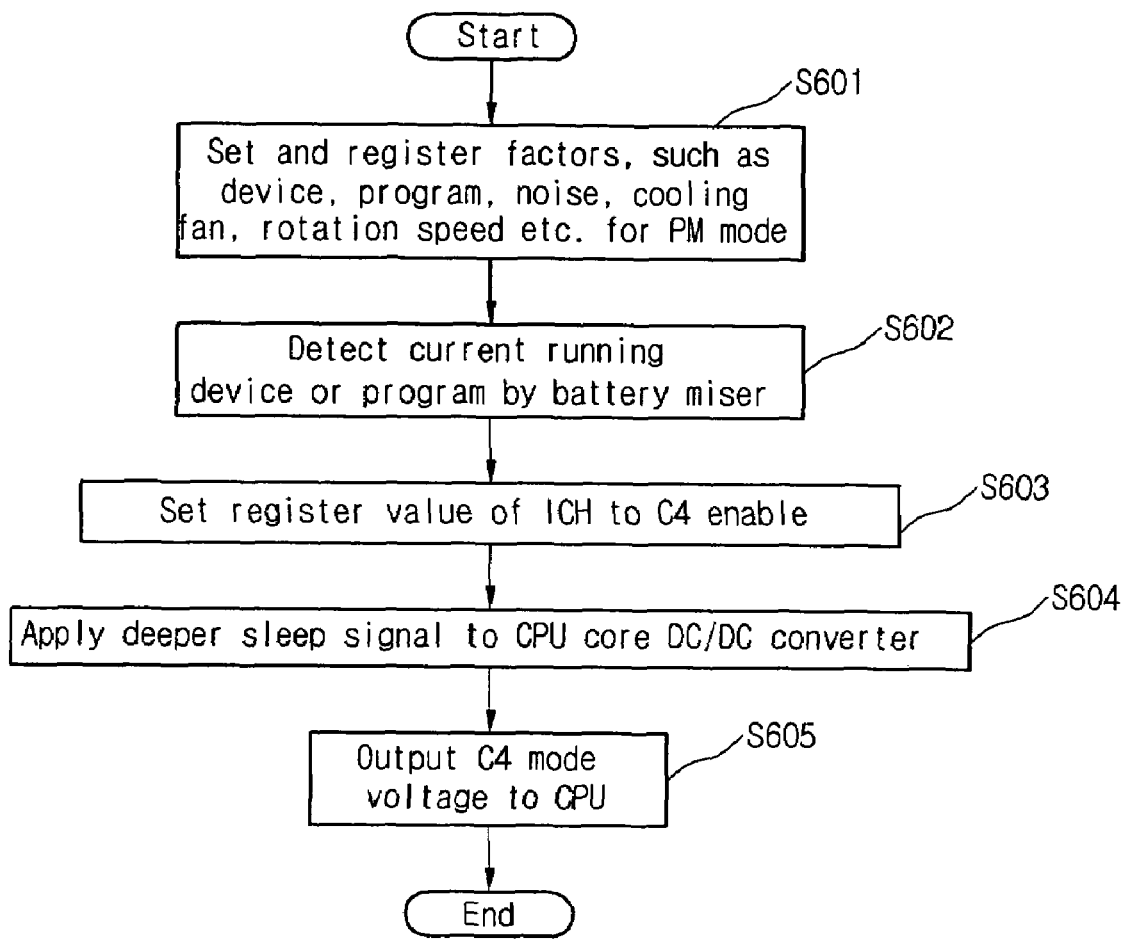
FIG. 6 is a flowchart showing an embodiment of a process of performing the C4 mode of PM modes according to the present invention.

FIG. 6 is a flowchart showing an embodiment of a process of performing the C4 mode of the PM modes according to the present invention. The embodiment of FIG. 6 can be applied to and will be described using the embodiment of an apparatus shown in FIGS. 2-4. However, the present invention is not intended to be so limited.

As shown in FIG. 6, devices or factors for the PM modes can be set/registered in the battery miser program (block S601). The devices can include a current running device, a program, a sound output, a noise, and a rotation speed of a cooling fan.

The battery miser (e.g., filter driver, hook routine) can detect at least one of the current running device, the program, the noise, and the rotation speed of the cooling fan, based on the set/registered information (block S602). A register value or the like of the control device (e.g., ICH) can set to enable the C4 mode of the PM modes, based on the detected information (block S603).

The South bridge (e.g., ICH) can apply a deeper sleep signal to the CPU core DC/DC converter, based on the set value (block S604). A voltage corresponding to the deeper sleep signal can be outputted from the CPU core DC/DC converter to the CPU (block S605).

Figure 7:
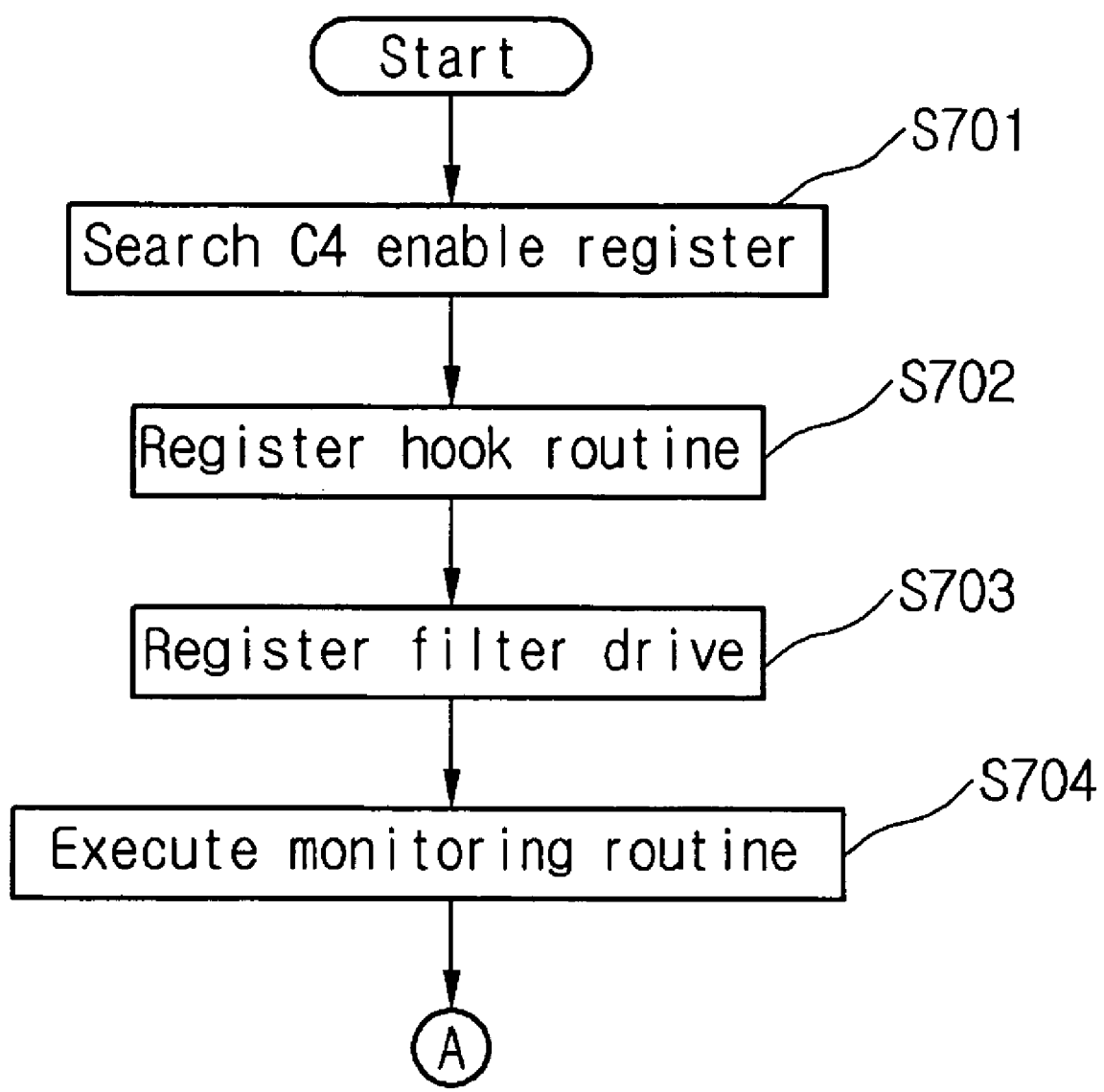
FIG. 7 is a flowchart showing an embodiment of an operation after a battery miser is installed.

FIG. 7 is a flowchart showing an embodiment of an operation after the battery miser is installed according to the present invention. The embodiment of FIG. 7 can be applied to and will be described using the embodiment of an apparatus shown in FIGS. 2-4. However, the present invention is not intended to be so limited.

As shown in FIG. 7, it can be checked whether the South bridge is a chipset that can enable the C4 mode. For example, a C4 enable register can be searched (block S701).

While the battery miser is installed, the hook routine (e.g., a Player program or a Winamp program, which is a program that will be monitored) can be registered in an operating system (OS) (block S702). Further, the filter driver for each device can be registered (block S703).

A monitoring routine is preferably resident on the OS after the battery miser is installed. The resident monitoring routine can be executed when the program is run (block S704).

Figure 8:
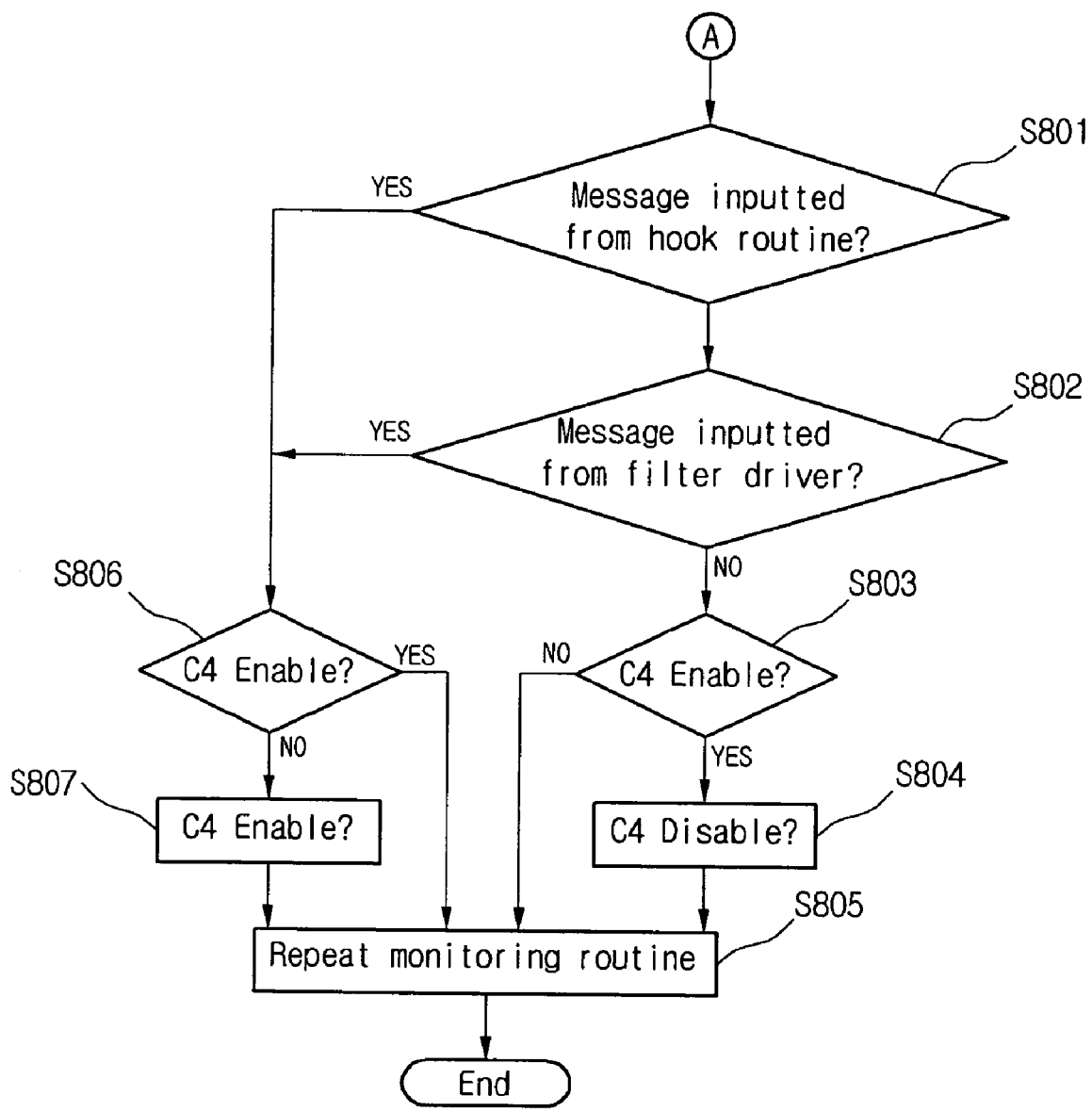
FIG. 8 is a flowchart showing an embodiment of an operation when the C4 mode of the PM modes is executed in an enable/disable state.

FIG. 8 is a flowchart showing an embodiment of an operation when the C4 mode of the PM modes is executed in an enable/disable state according to the present invention. As shown in FIG. 8, an operation of a specific device, an operation of a specific program, or a satisfaction/dissatisfaction of a condition preset by the system can be monitored by the filter driver, the shell execute hook routine or the user/control device, respectively. However, the present invention is not intended to be so limited.

It can be checked whether a detection message representing the use of the specific program is inputted from the hook routine or not (block S801). If the detection message is inputted, a C4 enable command can be executed (block S806).

If a current mode is determined to already be in the C4 mode (block S806), the process is ended or preferably the monitoring routine can be repeated (block S805). Meanwhile, if the current mode is not in the C4 mode (block S806), the system can be set to enter the C4 mode (block S807).

When the detection message is not inputted (block S801), it can be checked whether a message is inputted from the filter driver (block S802). When the message is inputted from the filter driver, the C4 enable routine can be executed (blocks S806, S807).

When the Filter message is determined not to be inputted, it can be checked whether a current mode is the C4 mode (block S803). If the current mode is the C4 mode, the C4 mode can be disabled (block S804). If the current mode is not the C4 mode, the monitoring routine can continue (block S805). For example, the monitoring routine can be repeated periodically, upon request according to a status change or the like.

FIG. 9A is a diagram showing an exemplary routine for registering a shell execute hook used to hook the running program. FIG. 9B is a diagram showing an exemplary routine for unregistering a shell execute hook.

FIG. 9C is a diagram showing an exemplary routine for reading a program to be tested from a registry during a hooking. FIG. 9D is a diagram showing an exemplary hooking routine that is called when a program is executed on (e.g., Windows).

When the operation mode of the CPU is changed into the deeper sleep mode (C4), the audible noise can be generated by the capacitors of the DC/DC converter. Therefore, the C4 mode has not been used. However, according to embodiments of the present invention, the C4 mode can be enabled when a selected device or a selected application/program is detected or when the preset conditions are satisfied. Accordingly, power consumption can reduced or less heat can be generated. Also, the lifetime of the battery can be increased.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments. Furthermore, for ease of understanding, certain method procedures may have been delineated as separate procedures; however, these separately delineated procedures should not be construed as necessarily order dependent in their performance. That is, some procedures may be able to be performed in an alternative ordering, simultaneously, etc As described above, embodiments of an apparatus and method for controlling power management have various advantages. For example, according to embodiments of the present invention the C4 mode can be used when a device or program is detected or when a preset condition is satisfied. Also, the C4 mode can be directly or automatically enabled by employing a filter driver to monitor the use of the preset device or component. In addition, the C4 mode can be used depending on the execution or operation state of at least one specific application by the program, for example, the shell execute hook routine. Further, the C4 mode can be used when a battery mode, a sound output and an earphone are detected or when a surrounding noise level is higher than a preset level. When the specific device or program is detected or when the specific conditions are satisfied, the corresponding voltage can be outputted in response to a control signal such as outputted from the register of the South bridge.

The foregoing embodiments and advantages are merely exemplary and are not to be construed as limiting the present invention. The present teaching can be readily applied to other types of apparatuses. The description of the present invention is intended to be illustrative, and not to limit the scope of the claims. Many alternatives, modifications, and variations will be apparent to those skilled in the art. In the claims, means-plus-function clauses are intended to cover the structures described herein as performing the recited function and not only structural equivalents but also equivalent structures.

What is claimed is:

1. An apparatus for controlling a power management in a system that uses a power source, the apparatus comprising:
a detection block configured to detect whether a prescribed condition is satisfied; and
a control device coupled to the detection block configured to output a signal corresponding to a C4 power management state based on information detected by the detection block, wherein the prescribed condition is whether at least one prescribed device is currently in use, whether a prescribed application is currently in use, or a user-condition related to sound, wherein:
detection of the prescribed device or the prescribed application currently in use is carried out by a power management routine,
the power management routine is a battery miser application that includes a filter driver or a shell execute hook routine configured to respectively detect at least one of the prescribed device or the prescribed application, and
the battery miser application is stored in a hard disk drive (HDD) of a memory device loaded on a main memory during a system operation and is executed by a central processing unit (CPU) of the control device.

2. The apparatus of claim 1, wherein the control device includes a South bridge configured to manage a peripheral device and a power device, wherein the South bridge is configured to generate a specific signal value to the power device when the detection block detects the at least one prescribed device or the prescribed application is currently in use or the user-condition related to sound.

3. The apparatus of claim 2, wherein the South bridge includes a register where a C4 selected value is set based on the detected result of the detection block, wherein an enable signal for allowing a CPU to operate in the C4 power mode is outputted when the C4 selected value is set in the register based on the detected result of the detection block.

4. The apparatus of claim 1, wherein when the prescribed device or application is detected to currently be in use or when the user-condition related to sound is detected, a corresponding voltage is outputted to a power device in response to a signal outputted by a C4 bit being set in a register of a South bridge for managing a peripheral device and the power device.

5. A method for controlling a power management, comprising: detecting whether a preset device or a preset application is used in a system; controlling a C4 power management mode of a power device based on the detected result; and
performing a power management based on the controlling operation, wherein:
said detecting is carried out by a power management routine,
the power management routine is a battery miser application that includes a filter driver or a shell execute hook routine configured to respectively detect at least one of the preset device or the preset application, and
the battery miser application is stored in a hard disk drive (HDD) of a memory device loaded on a main memory during system operation and is executed by a central processing unit (CPU).

6. The method of claim 5, further comprising:
detecting a device or a program currently used in the system, the detecting operation carried out by a control device that controls a C4 power management function or program;
setting a register value corresponding to the detected device or program, wherein the setting operation is performed by a device that controls a peripheral device and a power source; and
outputting a corresponding voltage from a power device that is controlled by a signal outputted corresponding to the register value.

7. The method of claim 5, wherein the preset device used in the system is operated by one or more programs.

8. The method of claim 7, wherein when a power management is performed on the preset program, a connection program is selected to set a corresponding program or register a target program.

9. The method of claim 5, wherein the detecting comprises detecting information of a preset condition that includes use of a battery as a power source of the system, a surrounding noise whose level is higher than a preset level, the use of a speaker, or a rotation speed of a cooling fan.

10. A method for controlling a power management, comprising:
registering information to operate a C4 power management mode;
detecting a current system operation information based on the registered information;
outputting a C4 power management control signal to a power device in when the detection detects the registered information is satisfied; and
controlling a control device based on the C4 power management control output signal, wherein the information registered to operate as the C4 power management mode includes at least one prescribed device to be used or a prescribed application to be executed, and wherein:
detection of the prescribed device or the prescribed application is carried out by a power management routine,
the power management routine is a battery miser application that includes a filter driver or a shell execute hook routine configured to respectively detect at least one of the prescribed device or the prescribed application, and
the battery miser application is stored in a hard disk drive (HDD) of a memory device loaded on a main memory during system operation and is executed by a central processing unit (CPU).

11. The method of claim 10, comprising setting a register value of a control device as a power management mode value, based on the detected current system operation information, wherein the registering information is set by a user.

12. The method of claim 10, wherein the information registered to operate as the C4 power management mode includes at least one of a designed device or program operated in a system, a sound output, a surrounding noise level, or a rotation speed of a cooling fan.

13. The method of claim 12, wherein a South bridge (ICH) applies the C4 enable signal to a CPU core DC/DC converter in response to the set value, and wherein a voltage corresponding to the deeper sleep signal is outputted from the CPU core DC/DC converter to the CPU.

14. A method for controlling a power management, comprising:
registering a specific program for monitoring at least one of a running program or a running device;
configuring a specific device so as to monitor an operating state in a system;

searching whether a C4 mode of power management modes is supported according to types of a control device;

operating at least one of a monitoring device or a program for the C4 mode;

outputting a signal for controlling an enable/disable of the C4 mode, based on at least one of a result of the operation of the C4 monitoring device or program; and performing a power management based on the output signal, said method further comprising registering a monitoring device, wherein the registering comprises:

registering a hook routine for detecting the running program; and installing a filter driver in a specific device so as to detect an operating device, and wherein the operating the monitoring device comprises:

monitoring whether at least one of an operation of the specific device, an operation of the specific program, or a condition preset by a system is satisfied, setting a register value for performing the C4 mode, based on the monitored result, maintaining the C4 mode when the setting result is a C4 mode enable and a current mode is the C4 mode, enabling the C4 mode when the setting result is the C4 mode enable and the current mode is other than the C4 mode, disabling the C4 mode when the setting result is a C4 mode disable and the current mode is the C4 mode, and repeating the monitoring.

15. A method for controlling a power management, comprising:

monitoring for one or more specific conditions; and enabling performing a C4 power mode based result of the monitoring, wherein the one or more specific conditions include whether at least one of a prescribed device is currently in use or whether a prescribed application is currently in use, and wherein:

detection of the prescribed device or the prescribed application currently in use is carried out by a power management routine, the power management routine is a battery miser application that includes a filter driver or a shell execute hook routine configured to respectively detect at least one of the prescribed device or the prescribed application, and the battery miser application is stored in a hard disk drive (HDD) of a memory device loaded on a main memory during system operation and is executed by a central processing unit (CPU).

16. The method of claim 15, wherein the monitoring is performed by operating a detector to detect operation of the prescribed device.

17. The method of claim 16, wherein the detector is a filter driver and the prescribed device is a speaker.

18. The method of claim 15, wherein said selecting is performed by selection supported in the OS or by selection provided by manufacturer.

* * * * *